(12) United States Patent
Collins et al.

(10) Patent No.: US 7,228,104 B2
(45) Date of Patent: *Jun. 5, 2007

(54) ADAPTIVE CANCELLER FOR FREQUENCY REUSE SYSTEMS

(75) Inventors: Glenn D. Collins, San Jose, CA (US); Don L. Anair, San Francisco, CA (US); Michael J. Ready, Santa Cruz, CA (US)

(73) Assignee: Applied Signal Technology, Inc., Sunnyvale, CA (US)

( * ) Notice: Subject to any disclaimer, the term of this patent is extended or adjusted under 35 U.S.C. 154(b) by 232 days.

This patent is subject to a terminal disclaimer.

(21) Appl. No.: 11/045,782

(22) Filed: Jan. 28, 2005

(65) Prior Publication Data

US 2005/0159128 A1 Jul. 21, 2005

Related U.S. Application Data

(63) Continuation of application No. 09/886,516, filed on Jun. 21, 2001, now Pat. No. 6,859,641.

(51) Int. Cl.
*H04B 1/00* (2006.01)
*H04B 17/02* (2006.01)
*H04B 1/06* (2006.01)

(52) U.S. Cl. .................. 455/63.1; 455/139; 455/278.1

(58) Field of Classification Search ............... 375/319, 375/326; 455/63.1, 67.11, 67.13, 139, 275, 455/276.1, 278.1, 283, 284, 285

See application file for complete search history.

(56) References Cited

U.S. PATENT DOCUMENTS

| | | | |
|---|---|---|---|
| 3,419,682 A | 12/1968 | Thompson et al. | |
| 3,750,179 A | 7/1973 | Tewksbury | |
| 3,993,867 A | 11/1976 | Blood, Jr. | |
| 4,086,534 A | 4/1978 | Olson | |
| 4,140,972 A | 2/1979 | Fletcher et al. | |
| 4,146,838 A | 3/1979 | Takada | |
| 4,178,550 A | 12/1979 | Acampora et al. | |
| 4,320,498 A | 3/1982 | Justice | |
| 4,385,378 A | 5/1983 | Kreutel, Jr. | |
| 4,393,494 A | 7/1983 | Belforte | |
| 4,470,138 A | 9/1984 | Gutleber | |
| 4,516,236 A | 5/1985 | Hadziomerovi | |
| 4,535,445 A | 8/1985 | Lane et al. | |
| 4,593,399 A | 6/1986 | Baugh et al. | |
| 4,701,935 A | 10/1987 | Namiki | |
| 4,712,235 A | 12/1987 | Jones, Jr. | |
| 4,896,371 A | 1/1990 | Kahn | |

(Continued)

*Primary Examiner*—Bing Q. Bui
(74) *Attorney, Agent, or Firm*—Barry N. Young

(57) ABSTRACT

An adaptive interference canceller for canceling an interfering signal corresponding to a delayed, frequency translated, amplitude and phase offset version of a transmitted signal contained in a composite received signal relayed through a relay system such as a satellite transponder. The canceller digitally downconverts the received signal and a local replica of the transmitted signal from IF to baseband, applies a variable delay and frequency compensation to the replica as a coarse delay and frequency correction, and tracks fine delay, amplitude and phase differences using an adaptive finite impulse response filter to generate a cancellation signal corresponding to the delayed and frequency shifted version. A minimum output power process produces an error signal that drives the variable delay and adaptive filter to minimize the power in the signal of interest to maximize cancellation of the interfering signal.

21 Claims, 6 Drawing Sheets

U.S. PATENT DOCUMENTS

| | | |
|---|---|---|
| 4,952,193 A | 8/1990 | Talwar |
| 4,995,104 A | 2/1991 | Gitlin |
| 5,131,032 A | 7/1992 | Esaki et al. |
| 5,193,112 A | 3/1993 | Sano |
| 5,307,405 A | 4/1994 | Sih |
| 5,436,887 A | 7/1995 | Eisenhuth |
| 5,444,864 A | 8/1995 | Smith |
| 5,450,456 A | 9/1995 | Mueller |
| 5,475,731 A | 12/1995 | Rasmusson |
| 5,596,439 A | 1/1997 | Dankberg et al. |
| 5,691,978 A | 11/1997 | Kenworthy |
| 6,011,952 A | 1/2000 | Dakberg et al. |

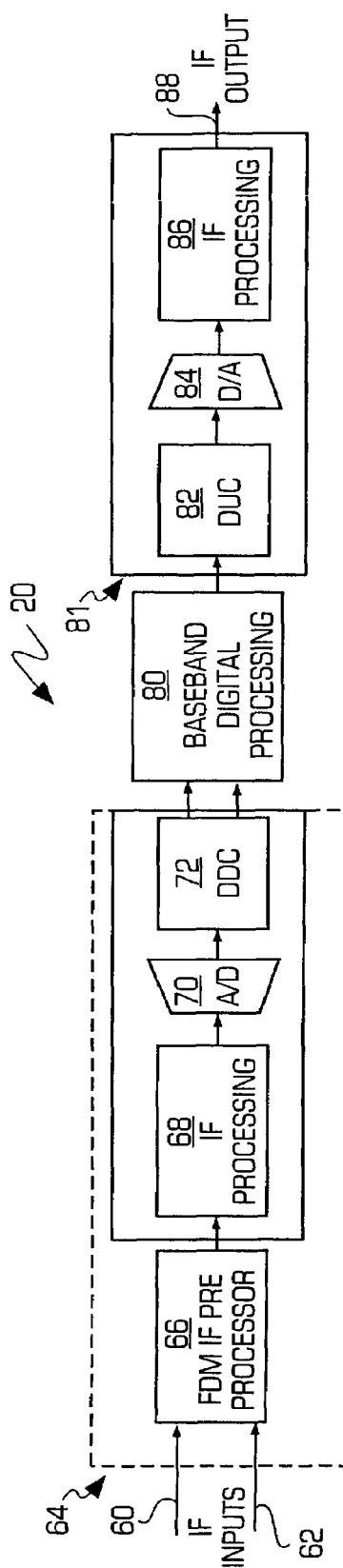
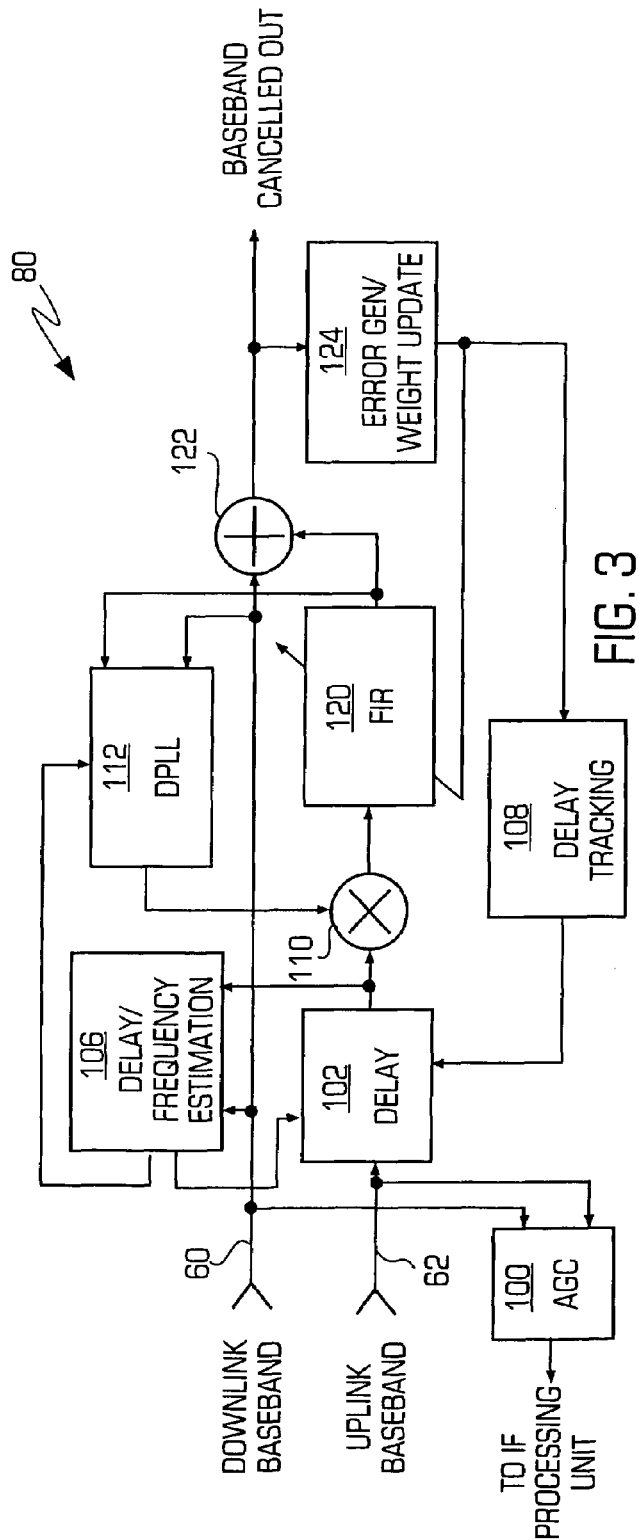
FIG. 2
FIG. 3

ADAPTIVE CANCELLER FOR FREQUENCY REUSE SYSTEMS

This application is a continuation of application Ser. No. 09/886,516 now U.S. Pat. No. 6,859,641, filed Jun. 21, 2001, the disclosure of which is incorporated by reference herein.

BACKGROUND OF THE INVENTION

This invention relates generally to communications systems, and more particularly to adaptive canceller architectures for use in multiple carrier frequency reuse communication systems, such as satellite communication systems.

In a conventional duplex communications system in which each of the sites of the system transmits and receives information to and from the other site, each site transmits on one frequency and receives information on another frequency. As a result, duplex communications require twice the bandwidth of a unidirectional communication link. This is costly where the available bandwidth is limited since it restricts the number of sites which can communicate over the system. This is particularly true with satellite communications systems. With satellites, transponder bandwidth is limited and system resources are costly.

In many relay-based communications systems, such as satellite links where the two transmitter/receiver sites will be in the same satellite beam, a downlink will be seen not only at the intended receiver site but also at the transmitter source of the downlink signal. Thus, each site receives not only the intended downlink signal from the other site, it also receives a replica of its own transmitted uplink signal. The replica comprises the uplink signal delayed in time by the roundtrip transmission time between the transmitter and the satellite, and it will be at a different signal level of course. Satellite and similar relay systems do not generally demodulate a received uplink signal, but merely translate, i.e., shift, the frequency of the uplink signal to a different frequency and transmit it back to the ground. The satellite on-board electronics that receives the uplink signal, frequency translates it to the downlink frequency, and transmits the downlink signal back to earth is called a transponder. Thus, the satellite transponder may receive uplink frequencies from two different sites in, e.g., the 6 GHz range, and translate the received signals to downlink frequencies in, e.g., the 4 GHz range. Each site could be assigned a different uplink frequency in the 6 GHz range and a different receive frequency in the 4 GHz range. As stated earlier, this requires twice the bandwidth of a unidirectional link.

Where both sites and, therefore, both the uplink and downlink signals are in the same satellite spot beam, systems have been developed that make more efficient use of bandwidth. These systems allow reuse of frequencies by two sites, thereby eliminating one uplink frequency and one downlink frequency. This doubles the available bandwidth of the satellite transponder. The basic idea behind these systems is that the received downlink signal at the first site is a composite signal comprising the sum of the desired signal of interest from the second site combined with a replica of the first site's own transmitted uplink signal. Thus, the signal of interest can be obtained by subtracting from the composite downlink signal the portion of the downlink signal due to the first site's own uplink signal. This requires generating a local replica of the uplink signal that has been relayed by the transponder. The relayed portion or replica of the uplink signal from the first site, received back on the downlink, is treated as interference and is removed from the composite downlink signal by an interference canceller.

In these known systems, the interference canceller is merely a device which produces and subtracts the replica of the interfering signal from the composite signal to give the signal of interest. The replica is derived from the uplink signal by estimating certain parametric changes imposed on the relayed uplink signal due to its roundtrip through the satellite transponder. These include not only the roundtrip time delay, but also the changes in signal level, frequency and phase that are experienced by the relayed uplink signal. These changes or parameters are estimated by the interference canceller and are applied to a local sample of the uplink signal as it is transmitted to produce the replica which is subtracted from the composite signal by the interference canceller.

The degree of cancellation of the interfering signal depends upon the accuracy with which the compensation parameters applied to the sample of the uplink signal can be estimated. Unfortunately, the changes experienced by the uplink signal are not static. Rather, they are dynamic and vary in time. Variations result from different causes. For one, satellites are not stationary, but tend to precess about a nominal location or position. This causes the distance between a transmitter/receiver site and the satellite to vary with time, which produces a varying time delay. It also produces variations in frequency and in phase due to Doppler shifts, and produces signal level variations. Moreover, the frequency translation circuits in the satellite transponder may also drift or vary in time, producing additional variations which are imposed upon the interfering downlink signal. Other effects that are relatively static but unknown include frequency-dependent amplitude and group delay distortion due to electronics at both the transmit and receive sites as well as in the satellite. The interference canceller must mimic these distortion components to provide adequate cancellation. Known interference cancellers attempt to estimate and track the static and dynamic variations in parameters to improve the accuracy of cancellation. However, this is a complex task. Known interference cancellers tend to be rather complicated, and lack the desired precision and accuracy in estimating the cancellation parameters to afford desired levels of cancellation of the interfering signal.

Additionally, known interference cancellers must be specifically designed or adapted for the satellite receiving systems with which they are intended to be used. This is because the interference canceller must be specially designed to interface to and be compatible with the satellite receiving system. This complicates the task of retrofitting or upgrading existing satellite receiving systems, or providing a universal interference canceller, since the interference canceller must be designed to be compatible with the electrical and mechanical specifications of the system hardware and software. Known interference cancellers also frequently must exploit a priori knowledge of certain external signal characteristics or the underlying data stream used to generate the uplink signal. This dependence also complicates any efforts to adapt the canceller to other systems.

It is desirable to provide adaptive interference cancellers which solve these and other problems of known interference cancellers by improving the compensation parameter estimation and cancellation functions while reducing complexity in the cancellers affording a higher degree of precision and accuracy in canceling interfering signals (hence providing better performance), and leading to cost-reduced solutions. It is to these ends that the resent invention is directed.

SUMMARY OF THE INVENTION

The invention solves the foregoing and other problems with present interference cancellers in a highly effective and efficient manner. The invention operates on IF signals prior to demodulation to cancel interfering signals by downconverting the signals to digital baseband signals, adaptively tracking and canceling time varying delay, amplitude and frequency offsets between the interfering signal and the local replica to generate a cancellation signal. The cancellation signal is subtracted from the received signal to produce the signal of interest. The signal of interest is then upconverted back to IF and demodulated in a normal manner using the conventional receiver electronics called a demodulator. The demodulator is typically included in the same electronics package with the modulator that generates the transmit signal. The combined modulator and demodulator is commonly referred to as a modem. This allows the invention to be a "drop in" element that can be readily used with existing receiving systems with little or no modification to the system.

In one aspect, the invention affords a method and system of canceling an interfering signal contained in a received signal which includes a signal of interest, where the interfering signal is a delayed and frequency offset version of a transmitted signal from the location of the received signal, in which the received signal and a sample of the transmitted signal are converted to digital form. Variations in delay and frequency offset between the interfering signal and the sample of the transmitted signal are tracked to produce a compensating signal which is combined with the received signal to cancel the interfering signal and produce the signal of interest. An error signal representing any uncanceled components of the interfering signal in the signal of interest is generated from the signal of interest, and used to control the tracking to minimize offsets between the compensating signal and the interfering signal.

In another aspect, the invention affords a method and system for canceling at a receiving site an interfering signal in a received signal that contains the interfering signal and a signal of interest, the interfering signal corresponding to a delayed and frequency offset version of a transmitted signal transmitted from the site, in which the received signal and a replica of the transmitted signal at intermediate frequencies are converted to digital baseband digital signals. Offsets corresponding to coarse delay and frequency differences between the transmitted signal and the interfering signal are applied to the replica of the transmitted signal to produce an initial compensated replica of the transmitted signal. Variations in delay and frequency offset between the initial compensated replica and the interfering signal are tracked to produce a second compensated signal which is combined with the received signal to cancel at least in part the interfering signal. Fine tracking and cancellation of any remaining portions of the interfering signal is accomplished by generating an error signal from the signal of interest and controlling the tracking with the error signal.

In yet another aspect, the invention affords an interference canceler for canceling an interfering signal corresponding to a delayed and frequency shifted version of a transmitted signal from a received signal containing the interfering signal and a signal of interest. The canceller comprises a variable delay for applying an initial delay compensation to a replica of the transmitted signal, and a variable frequency element for tracking changes in frequency and for applying an initial frequency compensation to the replica of the transmitted signal. An adaptive filter is employed for tracking delay, frequency dependent amplitude and phase variations following the initial compensations for delay and frequency to produce a resulting cancellation signal. The cancellation signal is combined with the received signal in a combiner to cancel the interfering signal and produce the signal of interest.

Other aspects of the invention will become apparent from the description which follows and as described below.

BRIEF DESCRIPTION OF THE DRAWINGS

FIG. 2 is a functional block diagram of an interference cancellation system in accordance with the invention which may be employed with the communications system of FIG. 1;

FIG. 3 is a block diagram showing in more detail the delay and frequency tracking systems, and the adaptive filter of the interference canceller of FIG. 2;

DESCRIPTION OF PREFERRED EMBODIMENTS

This invention is particularly applicable to satellite communications systems in which a satellite transponder translates the frequency of a received uplink signal to a new frequency and retransmits the received signal as a downlink signal on the new frequency, and will be described in that context. It will be appreciated, however, that this is illustrative of only one utility of the invention, and that the invention may be employed with any communication system which relays a received signal of interest as a composite signal that includes a replica of the receiving site's own transmitted signal. Examples include wireless and wireline communications systems.

Figure 1:
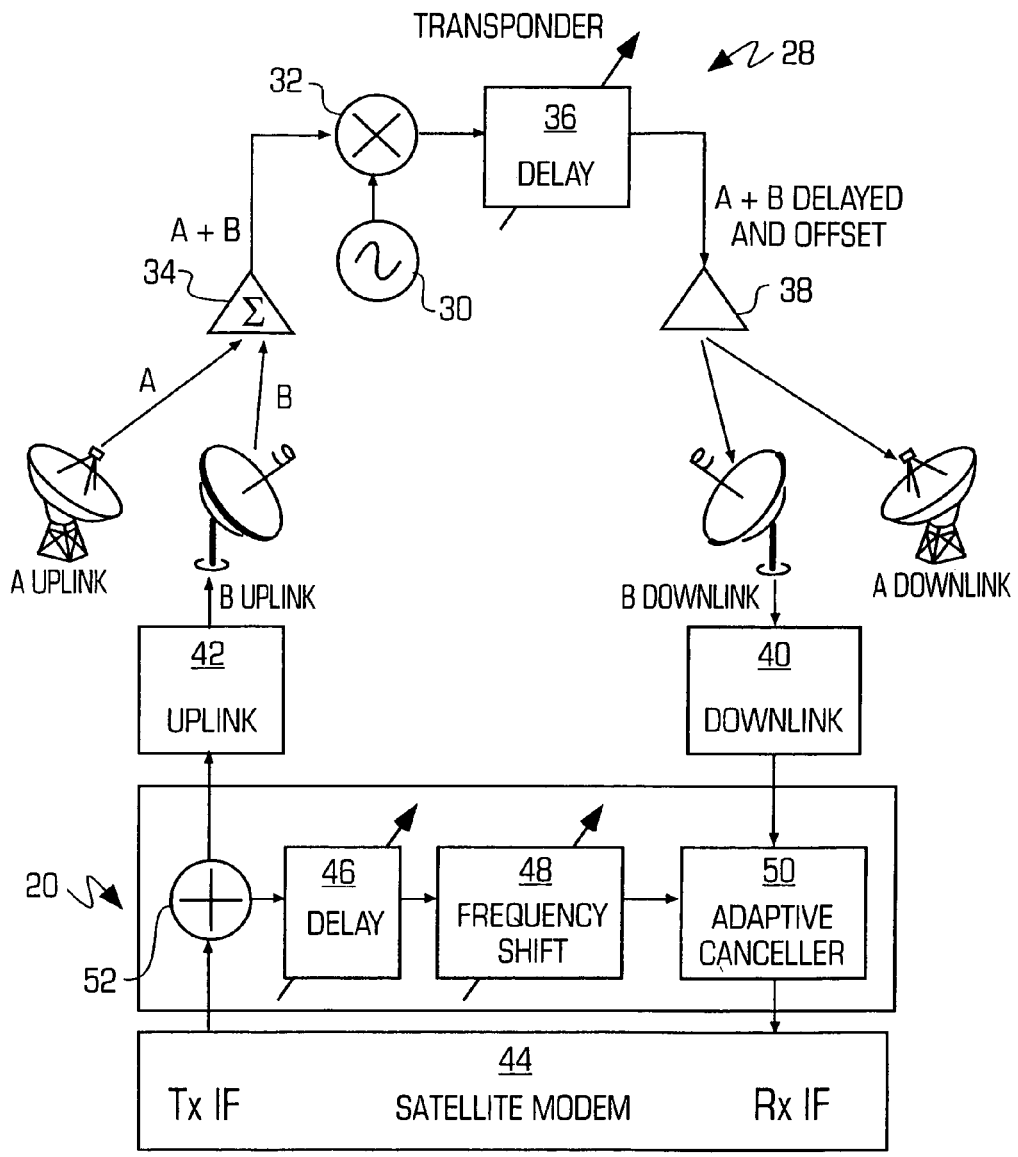
FIG. 1 is a diagrammatic view illustrating a satellite communications systems embodying the invention.

FIG. 1 illustrates diagrammatically a satellite communications system embodying a canceller system 20 in accordance with the invention. The satellite communications system may comprise first and second transmit/receive sites A and B, respectively. Each site transmits an uplink signal to a satellite transponder and receives a downlink signal from the satellite transponder 28. The uplink and downlink frequencies are generally in different frequency bands, e.g., the uplink frequencies may be in the 6 GHz frequency band, and the downlink frequencies may be in the 4 GHz band. Each site A and B may transmit and receive using either the one antenna having different feeds for the different frequencies or using different attenans which have appropriate feeds for the frequencies of the antennas. In either event, the two sites A and B are physically separated geographically from one another, but are located within the same satellite antenna beam. The satellite transponder does not demodulate the received uplink frequencies, but merely frequency shifts them to the appropriate downlink frequencies. This may be accomplished in a well known manner using conventional frequency conversion equipment, symbolized in FIG. 1 as comprising a local oscillator 30, a mixer 32, and a filter (not explicitly shown). Accordingly, each site A and B receives as a downlink signal a composite signal comprising the sum of a delayed and frequency offset version of the uplink signal from the other site, as well as its own uplink signal which has been delayed and offset (shifted) in frequency. This is illustrated diagrammatically in FIG. 1 which shows the uplink signals A and B from the two sites being summed at the satellite receiving antenna 34 to produce a composite uplink signal A+B to the transponder, and as showing the downlink composite signal from the transponder supplied to the two sites from the satellite transmitting antenna 38 as the signal A+B delayed and offset.

The delay imposed upon an uplink signal from a given site comprises the time required for the transmitted signal to propagate from the transmit site to the transponder, the time delay experienced within the transponder during the frequency conversion process, and the transit time for the signal to propagate back down from the transponder to the receiving site. The transit time for the downlink signal to propagate back down to the site which transmitted it will be different from the downlink signal transit time to the other site since the sites are geographically separated. There are also other factors which produce signal variations. Since a satellite precesses about its nominal position in orbit, the time delay will be time varying due to the changing distances from the sites to the satellite. Moreover, the frequency offset, and the corresponding phase offset will also vary due to Doppler shift and drift in the electronics. Additionally, atmospheric effects such as fading, electronics in the uplink and downlink sites and changes in transponder characteristics will all produce time-varying changes in frequency, phase, signal level and time delay in the signal. These variations are illustrated diagrammatically in FIG. 1 as a variable delay 36.

Satellite transponders have limited bandwidth, typically about 36 to 72 MHz, which can be used to carry multichannel communication signals such as FDMA, TDMA, or CDMA signals used for voice or data, as well as to carry television video and audio signals. Because the satellite transponder bandwidth is limited, and therefore a costly resource, it is desirable to reuse the available bandwidth for different purposes. Where transmit/receive sites A and B are within the same beam of the satellite transponder, and therefore receive a delayed and frequency offset replica of their own transmitted signal in the received downlink signal, systems have been developed which permit the two sites to reuse the same frequencies and bandwidth, for example, to afford a duplex communication link. This effectively doubles the available bandwidth of the transponder. These frequency reuse systems are based upon the principle that since the composite downlink signal comprises a linear combination of the signal of interest from the other site and an interfering signal comprising a delayed and frequency offset replica of the receiving site's own uplink signal, the interfering replica may be cancelled by locally generating an equivalent replica signal and subtracting it from the composite signal. These systems generate the local replica by estimating the delay and offset parameters and applying these to a sample of the uplink signal to produce a cancellation signal corresponding to the downlink replica. However, since the parameters are time varying, it is difficult to estimate or track these compensation parameters accurately.

Thus, known systems use rather complex signal processing techniques to estimate and track the changing parameters. These systems tend to be costly and may not achieve the desired degree of performance.

The adaptive cancellation system 20 of the invention avoids complexity and affords a highly effective cancellation system which is easily implemented in existing communications systems. As will be described in more detail shortly, the cancellation system preferably operates at an intermediate frequency ("IF") (typically 70 MHz) between the downlink downconverter 40 and uplink upconverter 42 and the satellite transmit and receive modem 44. This is advantageous since the adaptive cancellation system may be inserted into the IF of the receiver before demodulation, thereby obviating any modification to the modem or other processing circuits of the satellite receiving or transmitting system. Since it operates at IF, the adaptive cancellation system of the invention may be easily interfaced with existing receivers. Moreover, it requires no a priori knowledge of the upstream system. Thus, the canceller may be a "drop-in" component which may be used with existing satellite receiver systems.

As shown functionally in FIG. 1, the adaptive cancellation system 20 may include a variable delay 46 to compensate for the time delay, a variable frequency shifter 48 to compensate for the frequency offset, and an adaptive canceller 50 to track the changing parameters and apply them to a sample of the uplink signal to produce the cancellation signal which is subtracted from the composite downlink signal. The variable delay, variable frequency shifter, and the adaptive canceller operate on a sample of the uplink signal derived from a sampler device 52, such as a signal splitter or the like, which samples the IF uplink signal between the modem and the uplink upconverter 42. For purposes of illustration, FIG. 1 shows the adaptive cancellation system 20 applied to transmit/receive site B, where the composite downlink signal comprising the A+B delayed and offset signal is applied to the adaptive canceller 50 from downconverter 40 along with the delayed and frequency shifted replica of the uplink signal B forming the cancellation signal from the frequency shift unit 48. In practice, however, each site will have its own adaptive cancellation system.

FIG. 2 is a functional block diagram illustrating in more detail the adaptive cancellation system 20. The two inputs to the system comprise the downconverted downlink IF signal 60 and the uplink IF signal 62 applied to an IF processing and complex down conversion subsystem 64. This subsystem 64 may comprise an IF pre-processor 66, an IF processor 68, an analog-to-digital converter (A/D) 70 and a digital downconverter (DDC) unit 72. The downlink IF signal and the uplink IF signal are preferably separated in frequency, e.g., with the downlink signal (the signal of interest) being at, say, 70 MHz and the uplink signal at, say, 76 MHz so as to be non-overlapping. The IF pre-processor may multiplex the two input signals, filter and amplify the signals, and provide gain balancing so that the two signals nominally have the same power. The IF processing unit 68 may provide further filtering and gain control that adjusts the combined signals' power supplied to the A/D converter to optimize its dynamic range. An automatic gain control (AGC) unit, not shown, may adjust the uplink and downlink IF signals to match their powers, and adjust the signal levels supplied to the A/D. The A/D converter converts the multiplexed uplink and downlink analog signal to a digital signal stream, and supplies the digital signal to a digital down conversion unit (DDC) 72. The DDC performs a quadrature digital down conversion, in a well known manner, on the multiplexed uplink and downlink digital signals to separate and downconvert the two signals to individual digital baseband signals. The separate uplink and downlink baseband digital signals are supplied to a baseband digital processing system 80. Processing system 80 preferably comprises a microprocessor such as an Intel Pentium III3 or the like and associated memory and programming, and will be described as such herein. However, the processing system may also comprise dedicated electronics depending on implementation processing speed requirements. The baseband digital processing system 80 provides delay and frequency tracking, as well as adaptive filtering and cancellation, as will be described in more detail shortly. The output from the baseband digital processing system is the compensated signal of interest from which the interfering uplink signal has been cancelled. It is supplied to a baseband to IF converter 81 comprising a digital upconverter (DUC) 82, a digital-to-analog (D/A) converter 84 and to an IF processing unit 86. The IF output of the IF processing unit, comprising the signal of interest at 70 MHz, for example, is supplied to the satellite modem 44 (FIG. 1) where it undergoes normal demodulation and processing.

FIG. 3 illustrates in more detail the functions performed by the baseband digital processing system 80, and the cooperation of the processing system with the IF processing unit 64 and the baseband to IF converter 81. Substantially all of the functions indicated in FIG. 3 may be implemented in software which controls the microprocessor of the baseband digital processor or the dedicated electronics. As shown in FIG. 3, the baseband digital processing system 80 may comprise an automatic gain control (AGC) unit 100 which processes the combined signal power of the uplink and downlink signals 60 and 62, as previously described, to control the IF processor 68 so that the signal power of the uplink and downlink signals are nominally the same and so the combined signal power is optimized for the A/D converter 70 to make full use of the available dynamic range without causing saturation of the A/D. The uplink signal 62 from the IF processing and downconversion unit 64 is delayed by a variable delay unit 102 and applied as one input along with the received downlink signal 60 to a delay and frequency estimation unit 106, which will be described more fully shortly. Variable delay 102 may correspond substantially to the variable delay 46 of FIG. 1.

As shown, the output of delay 102 may be supplied as one input to a multiplier, e.g., a mixer, 110, which has a second input from the output of a digital phase lock loop (DPLL) 112. The output of the multiplier 110 is supplied to a variable adaptive finite impulse response (FIR) filter 120. The adaptive FIR filter output is supplied as one input to a combiner 122. The other input to the combiner is the downlink baseband signal which is the composite signal comprising the signal of interest and the interfering replica of the uplink signal. The output of the FIR filter, as will be described, comprises a compensation signal corresponding to the replica, but opposite in sign, i.e., 180° out of phase. The compensation signal is effectively subtracted from the downlink signal in the combiner 122 to provide as an output the signal of interest. The subtraction process cancels the interfering uplink signal.

The output of the FIR 120 is also supplied as one input to the digital phase lock loop (DPLL) 112, the other input of which is the composite downlink baseband signal 60 from the DDC 72 (FIG. 2). The digital phase lock loop serves to track the frequency variations of the downlink signal and to control the multiplier 110 to cause the frequency of the uplink sample used for the local replica to track the varying frequency of the downlink signal. The DPLL preferably comprises a digital implementation in the baseband digital microprocessor of a second order phase locked loop, in which the fundamental loop filtering operations are preferably performed at a decimated rate in order to reduce the processing load on the baseband digital microprocessor. The basic phase difference metric (common to the control of all phase locked loops) is derived from the two DPLL inputs by performing a complex cross correlation of the two inputs, i.e., complex conjugate multiplication followed by accumulation of the multiplication product samples, decimating (rate reducing) the correlation result to obtain a lower rate sample stream, and performing an arctangent (ARCTAN) operation to derive the desired phase. Subsequent loop filtering operations may be performed on the reduced rate phase data. By "decimating" is meant that rather than processing samples at the input data rate (that is, the input sampling and digitization rate) of the baseband digital processing system 80, samples are accumulated for a predetermined time, and the accumulated result is periodically sampled and processed. This results in a greatly reduced load on the microprocessor. At the output, the low rate, decimated and filtered phase data may be interpolated and smoothed to produce a high rate phase correction term for use by a numerically controlled oscillator (NCO), the digital equivalent of a local oscillator. This produces the desired output frequency correction term, which is in fact a complex exponential term at the original sample rate that may be used by the multiplier 110.

For proper cancellation, the estimate of the roundtrip delay of the uplink signal must be sufficiently accurate to fit within the time window of the adaptive FIR filter 120 of the canceller, as will be described, and the frequency offset between the composite signal A+B and the delayed version of the uplink signal must be small enough for the DPLL to acquire and track them. The delay and frequency estimation unit 106 provides a coarse initial estimate of the delay and frequency offset, and this is used to control the variable delay 46 and the variable frequency shift unit 48 (see FIG. 1) to provide a gross compensation for the frequency and delay offsets as will be explained in more detail shortly.

The delay and frequency estimation unit 106 may be a software process, running on the digital baseband microprocessor. From snapshots of the data (blocks of samples) on the two input channels (that is, the downlink 60 and uplink 62 channels), the delay and frequency estimation unit derives the differences in both delay and frequency of the uplink signal element which are common to both. These differences may be used to initialize both the delay unit 102 and the DPLL 112. The DPLL in particular requires that data at its inputs be fairly tightly aligned in both delay and frequency. The tight alignment is necessary in order for the DPLL to be able to subsequently acquire and continuously track the frequency difference of the uplink component common to both inputs. The delay and estimation process provides estimates which are close enough for the processing system 80 to acquire and track the differences in delay and frequency. They may be quite fine (as opposed to gross), and not require further refinement. The DPLL, for example, requires that its inputs be time aligned to about 1/(signal bandwidth), which is typically equivalent to about 2-3 time samples. The delay and estimation process, which will be described more fully below in connection with FIGS. 8 and 9, easily provides this kind of accuracy.

The compensations provided by the variable delay 46 and the variable frequency shift 48 afford a degree of signal alignment which, in a static environment, would be almost sufficient to fully support the desired cancellation process. However, the satellite communications environment is, in fact, dynamic, and continual fine adjustments are required to maximize the cancellation. The DPLL 112 itself provides the fine adjustment and tracking of the frequency differences, while the fine delay, amplitude and phase adjustments are most efficiently handled via the adaptive FIR filter 120 rather than the delay 102 because the adaptive FIR filter can delay the signal in increments less than one sample by adjusting the filter group delay.

The initial delay and frequency estimation unit 106 may employ a known ambiguity processing algorithm, such as described by S. Stein, "Algorithms for Ambiguity Function Processing", *IEEE Transactions on Acoustics, Speech, and Signal Processing*, Vol. ASSP-29, No. 3, pp 588-599, June 1981. This algorithm basically provides an efficient approach for performing a complex correlation between two input signals over a range of delays and frequencies. The result of such a computation is called an ambiguity function or an ambiguity surface. At the correct delay and frequency offset, a peak in the magnitude of the ambiguity function will appear. This correlation is preferably implemented using discrete time fast Fourier transforms (FFT) for the calculation of the ambiguity function to minimize the computational requirements and, hence, the processing time, as will be described.

Delay 102 may be controlled by a delay tracking unit 108 which serves to control the delay imposed on the uplink baseband sample to track the changing satellite link delay produced by the satellite's precession. The delay 102 and delay tracking unit 108 operate using an error signal from an error generator/weight update unit 124.

The adaptive FIR filter 120 is controlled by the error generation and weight update unit 124. This unit, which will be described in more detail in connection with FIG. 4, receives as an input the compensated signal of interest output from combiner 122, and provides updated filter tap weights which control the FIR filter 120 and an error signal which controls the delay tracking unit 108. The error generator/weight update unit and the FIR filter are in a closed loop feedback-configuration. The error generator and weight update unit control the FIR to minimize the unwanted interfering uplink signal which is present in the downlink signal output from the combiner 122.

The arrangement of the phase lock loop 112 as shown in FIG. 3, in receiving as inputs the output (rather than the input) of the FIR filter 120 and the frequency shifted/corrected downlink signal, enhances the cancellation performance of the system. Generally, when the uplink and downlink signals are offset (in delay) by more than half a baud (for digital signals) the signals will tend to become uncorrelated and poor cancellation will result. In addition, when the signals become uncorrelated, a PLL will be unable to acquire and track out the frequency differences between the two signals. This will cause the cancellation performance to be degraded. If the DPLL were placed before the canceller, the frequency differences could be tracked out as required, but the relative delay (of the DPLL inputs) would have to be corrected to within half a baud to ensure acquisition and tracking, and hence acceptable cancellation. If the delay offset were static, this requirement could easily be met. However, the Doppler shift will cause a time varying delay, and if it was required that the "coarse" delay from the delay unit be tracked so that it would always within half a baud, a significant burden would be placed on the delay-tracking algorithm, and this would unduly complicate the cancellation process. Rather, the invention avoids this complication by employing the arrangement illustrated in FIG. 3 with the phase lock loop 112 supplied by the output of the FIR filter and the downlink signal. The invention uses the adaptive FIR filter to track the slowly varying Doppler shift, continually adjusting both the relative delay and the phase for maximum cancellation. Although "coarse" delay tracking (in the delay unit) will still be necessary to keep the signals from shifting outside of the FIR filter window, course tracking will not have to be accurate to within half a baud. This significantly reduces complexity.

Figure 4:
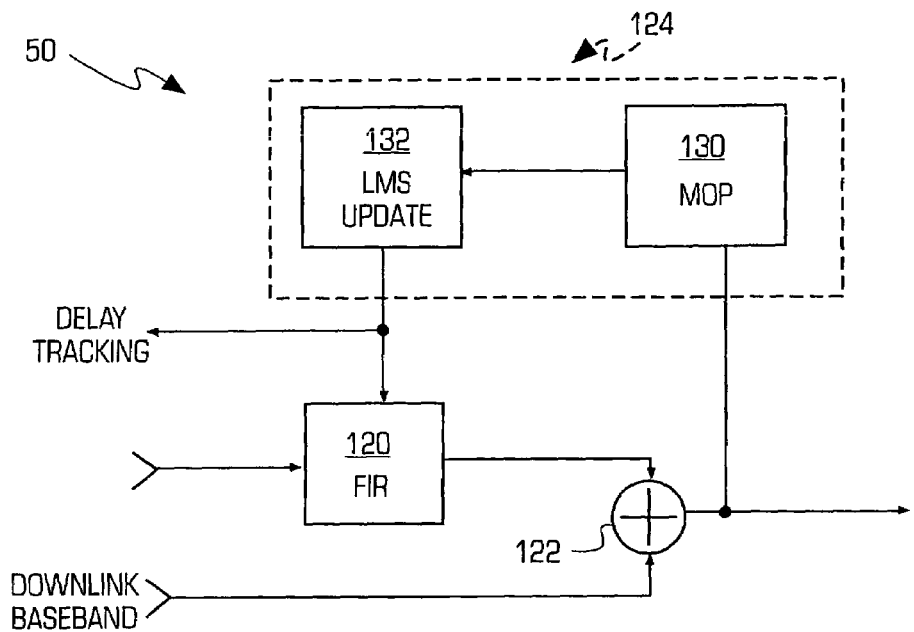
FIG. 4 is a block diagram of an adaptive canceller of the system of FIG. 3.

FIG. 4 illustrates in more detail a preferred architecture for the adaptive canceller 50 in accordance with the invention. In FIG. 4, the output from combiner 122, that comprises the signal of interest from which the interfering uplink signal has been cancelled, is sampled and supplied to a minimum output power (MOP) processor 130 which drives a least means square (LMS) weight update processor 132. The MOP processor 130 and LMS update processor 132 comprise the error generator/weight update unit 124 of FIG. 3. They control the adaptive FIR filter to cause a sample of the uplink signal to match the delayed version comprising the replica of the uplink signal that is present in the composite received signal. The adaptive filter will adjust for amplitude, phase and delay mismatches up to the length of the filter so that the output of the combiner 122 ideally will contain only the signal of interest. This is accomplished by adjusting the FIR filter so as to achieve minimum output power from the combiner.

MOP serves as an error criterion which determines when, by how much, and in what direction the output of the adaptive filter is in error. It is a forcing function for driving the adaptive FIR filter in the right direction. LMS is used as a preferred algorithm for actually updating the filter taps or weights in response to an error that has been generated by the MOP error criterion though other adaptive weight update algorithms may be used. In order to achieve the maximum possible cancellation from the combining process, which mathematically is just an addition of the two signals, the signals must be matched exactly in phase (ignoring for the moment the requisite 180° phase shift between them), amplitude, time delay, and frequency. The adaptive filter can adjust for and track relatively slowly varying changes in phase, amplitude and time delay. It can also track relatively small time varying phase changes, but it is limited in its capability to handle significant frequency offsets. To be more specific, the frequency offsets it can handle are generally much less than the range of offsets encountered in practice. Thus, the DPLL function is required to reduce the frequency differences between the two signals to a point where they have negligible impact on the cancellation process. Thus, the DPLL function really works as a compliment to the adaptive filter in that it tracks out the frequency differences, while the adaptive filter tracks out amplitude, phase, and delay differences.

Figure 5:
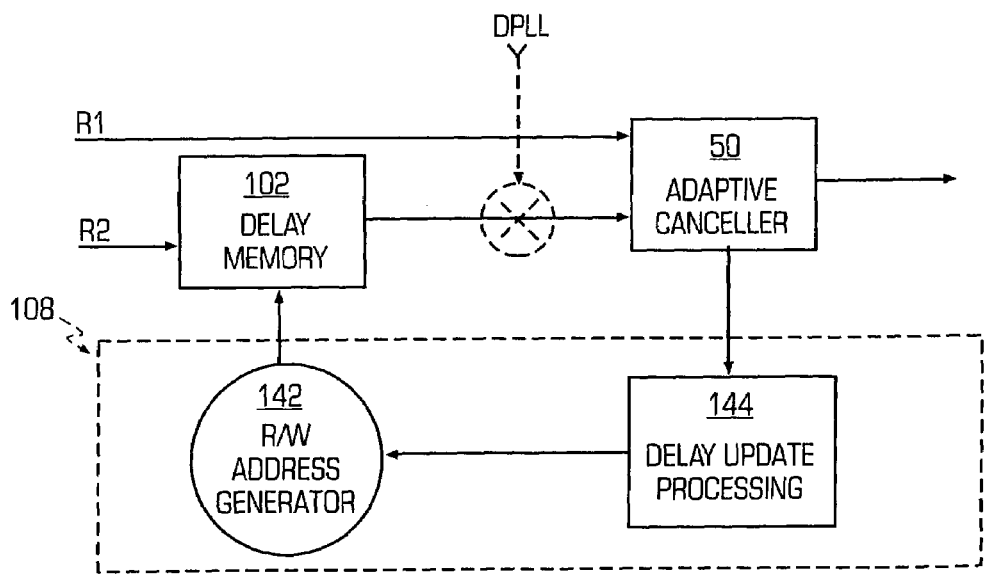
FIG. 5 is a block diagram of a delay tracking system of the interference cancelling system of FIG. 3.

FIG. 5 illustrates in more detail the arrangement of the delay unit 102 and the delay tracking unit 108 of FIG. 3 (144 and 142 in FIG. 5), and their operation with the adaptive canceller 50. Delay unit 102 may comprise a memory that tracks the changing satellite link delay caused by Doppler. Preferably, the delay unit is used for coarse delay tracking, to within a sample. The adaptive canceller 50 may comprise a tap delay line filter (shown in FIG. 6) for fine delay tracking. The delay memory 102 preferably comprises a dual port memory but many other delay memory devices could be used. The dual port memory may provide a bulk delay (D) approximately equal to the integer portion (M) of the total roundtrip delay present in the uplink replica (R2) contained in the composite downlink signal (R1). The total roundtrip delay is equal to M+P, wherein P is the fractional portion of the delay. The adaptive canceller effectively provides the fractional sample delay (P) and may provide a very small portion of the integer part as well.

As shown in FIG. 5, delay memory 102 may be controlled by a read/write (R/W) address generator 142 that is controlled by the delay update processing unit 144, and which is itself controlled by the adaptive canceller 50. The delay update processing unit is responsible for locating the centroid of the canceller's adaptive FIR filter tap weights and for driving the address generator and filter coefficients so as to keep the centroid positioned at the center of the adaptive filter tap weight array. This will be described shortly. Initially, the delay M+P is estimated by performing a complex correlation function on the two inputs to the canceller system comprising the downlink signal received from the transponder and he sample of the transmitted uplink signal. The initial delay estimate, D, must be within the canceller time window, as described previously, in order for the adaptive canceller to track the delay and perform cancellation. Once the delay is within the window, the canceller will adapt to and compensate for any fractional sample delay P. Since the delay M+P is not constant, it will be necessary to track it in order to keep D−(M+P) (the difference between the roundtrip delay estimate and the actual roundtrip delay) within the canceller window. This is done by the delay update processing block as described above. (FIG. 5 shows multiplier 110 in dotted lines between the delay memory 102 and adaptive canceller or the DPLL 112 which tracks frequency changes in the uplink signal.)

Figure 6:
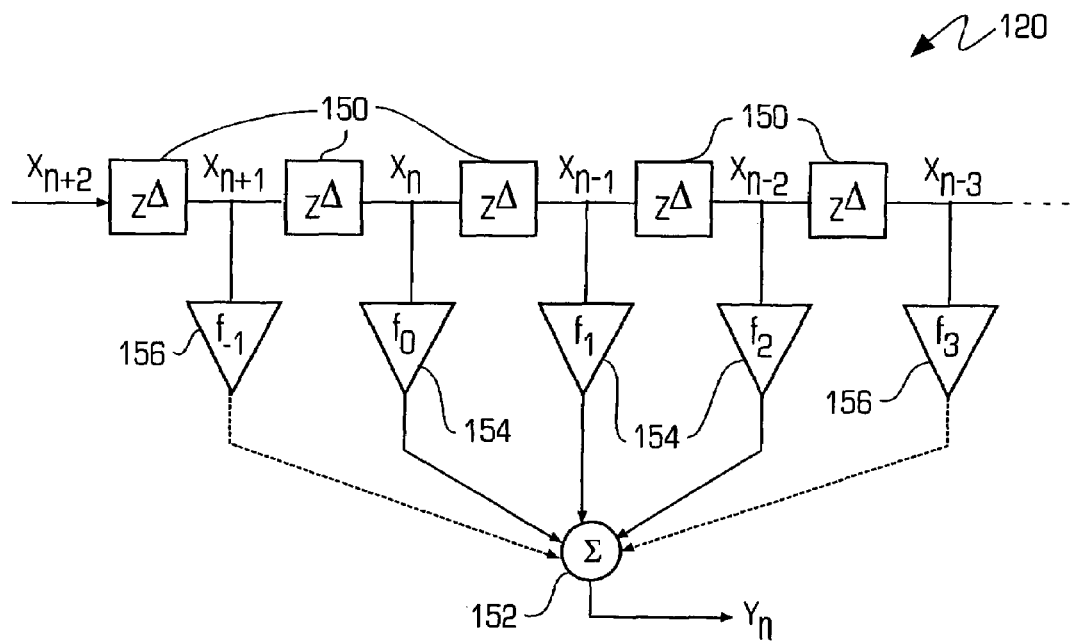
FIG. 6 illustrates an adaptive FIR filter of the interference canceller.

FIG. 6 illustrates a three tap adaptive FIR filter 120 which may be employed in the adaptive canceller 50. The FIR filter has a center of mass that is slowly varying. As shown, the filter may comprise a plurality of fixed delay stages ($Z^\Delta$) 150 with the output of each stage tapped by an amplifier 154, 156 and provided to a summer 152. The summer provides a combined output of the tapped stages of the filter. The objective is to adjust the coefficients ($f_i$) and the data input vector so as to maintain the center of mass of the input sector of the filter, and cause minimal disruption in the filter output. This can be visualized as a sliding window filter. FIG. 6 illustrates an infinite length filter in which only three taps are used to generate the output $Y_n$. The dash lines to the summer from taps 156 may be provided for greater precision, but it is not necessary they be used. $X_n$ is the input from the delay memory 102. The filter works in the following way.

The three taps 154 of the filter which are normally used are shifted among the various stages, i.e., delays of the filter, so as to maintain the center tap at the center of the filter. At a first time, n, the filter output is $y_n = f_0 x_n + f_1 x_{n-1} + f_2 x_{n-2}.$ At time n+1, the output of the filter becomes $y_{n+1} = f_0 x_{n+1} + f_1 x_n + f_2 x_{n-1}.$ (unshifted filter)

However, if it is decided that the centroid of the tap weights is no longer at $f_1$ but has shifted instead towards $f_2$, then the taps can be shifted such that $f_2$ becomes the center tap. This can be accomplished by disconnecting $f_0$ and connecting $f_3$. The output at time n+1 will now be $y_{n+1} = f_1 x_n + f_2 x_{n-1} + f_3 x_{n-2}$ (shifted filter)

Now the main tap is at the center of the filter as desired.

The filter operation described above is essentially a vector multiply, where the input vector is read from the delay memory and the filter vector is a set of coefficients. For normal operation with no shifts, the input data vector index is simply incremented for each new output. When a shift occurs in the filter taps, the input vector cannot be incremented as usual. In fact, in the example above, the same input samples used for generating $y_n$ are used for generating the shifted version of $y_{n+1}$. This has an effect on the operation of the Read/Write address generator 142 (FIG. 5). When a shift occurs, the address generator may be adjusted to read out the correct input samples. As long as the delay memory has sufficient length to support the maximum delay of the system, a dual port RAM may be used for the delay memory, and is sufficient to implement the algorithm.

Figure 7:
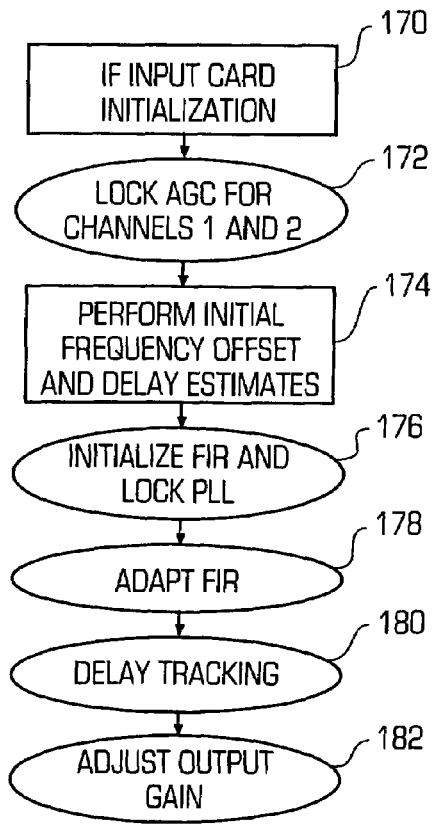
FIG. 7 is a flowchart illustrating the basic acquisition process performed by the interference canceller.
Figure 8:
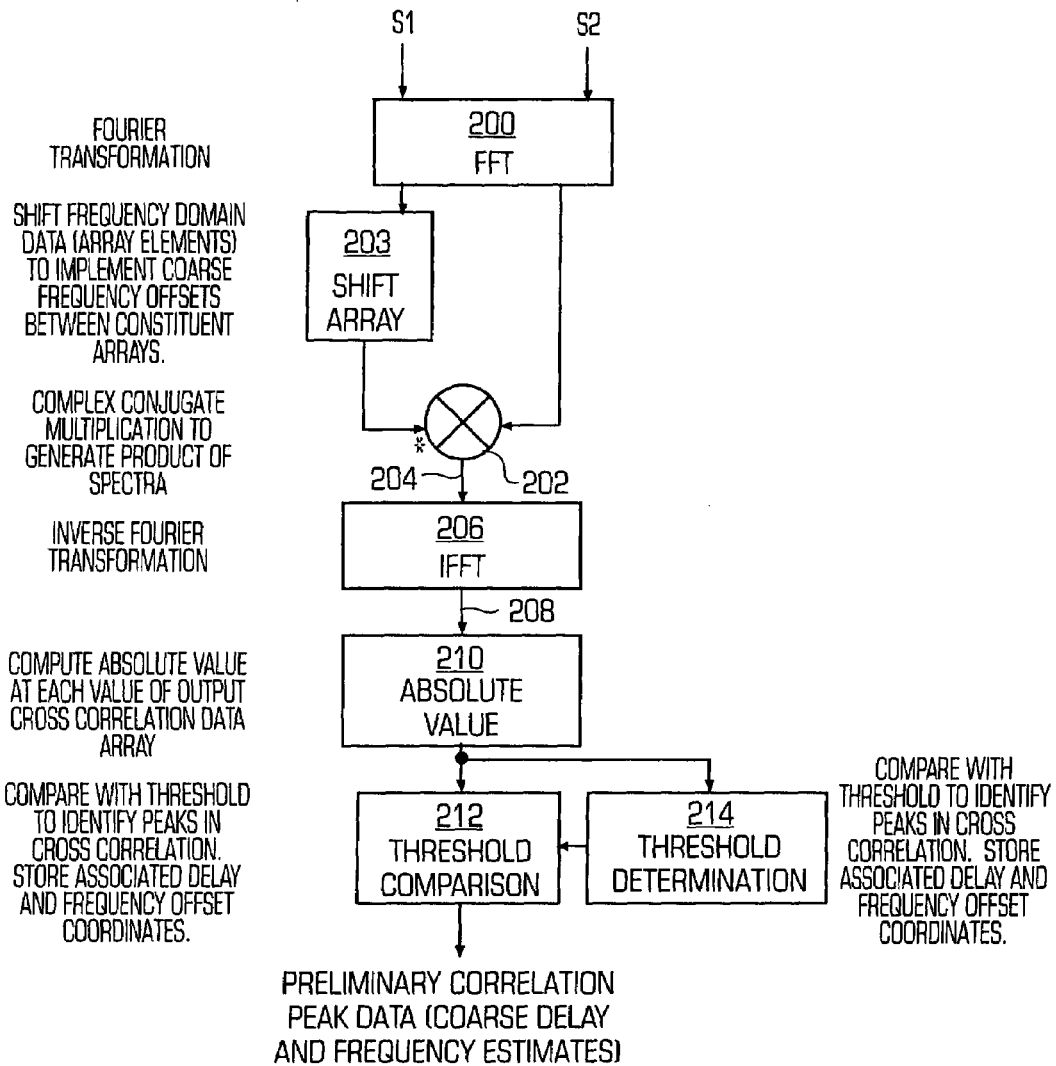
FIG. 8 is a flowchart illustrating a process for coarse frequency and delay estimation of the interference canceller in accordance with the invention.
Figure 9:
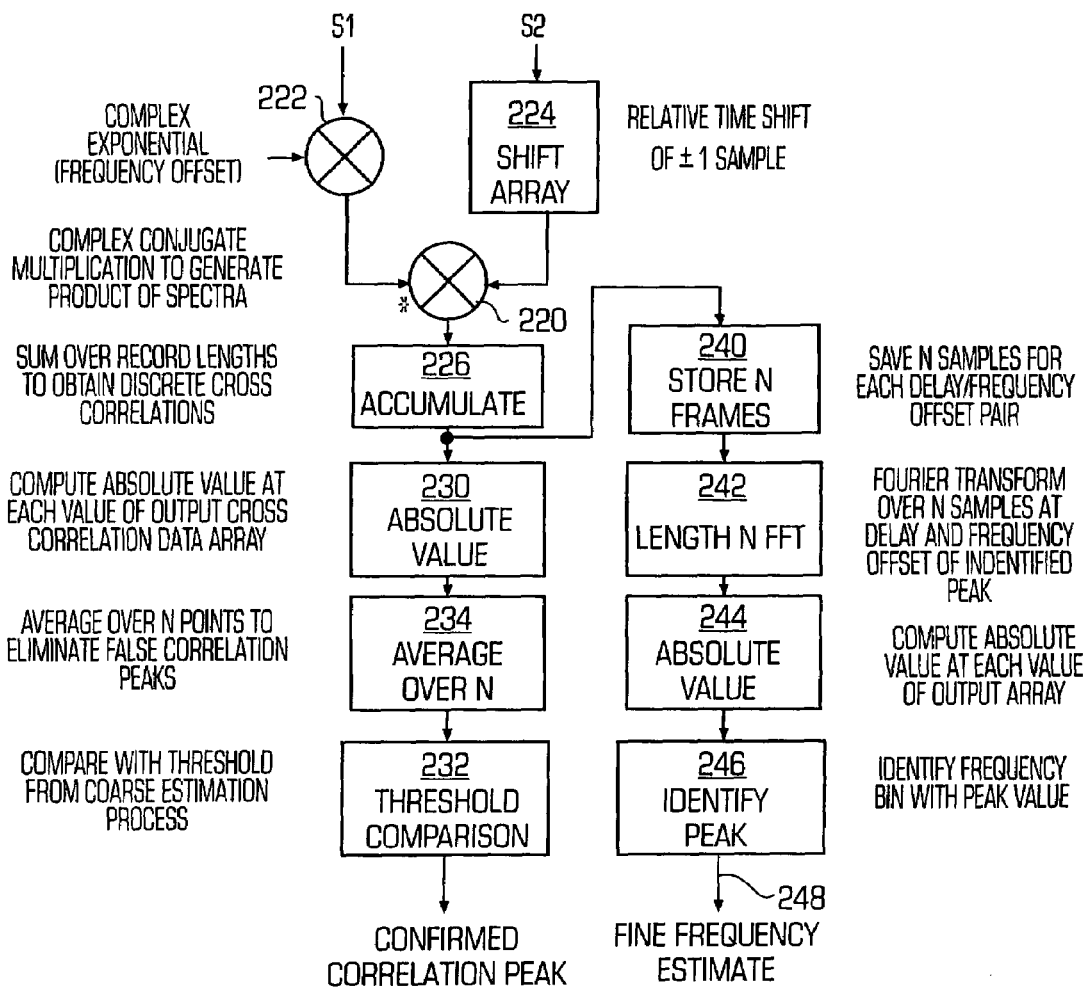
FIG. 9 is a flowchart illustrating a process for confirmation of a detected correlation peak and for fine frequency and delay estimation in accordance with the invention.

FIGS. 7-9 are flowcharts which illustrate the operation of the adaptive cancellation system of the invention. FIG. 7 shows the basic acquisition process. First, in step 170, an IF input card is initialized with the proper IF receive frequency (nominally 70 MHz) and sampling rate (which depends on the baud rate). The individual powers of the input signals are next adjusted with the AGC control loop at 172. When this loop is locked, the system will then determine initial frequency offsets and delay estimates at 174, as will be described below. The FIR will be initialized at 176 to a Sinc pulse shape, and the digital phase lock loop will be initialized with the frequency offset estimate. Once the DPLL is locked, adaptive cancellation can begin.

Cancellation begins at 178 with FIR adaptation. After a period of time (preferably of the order of 10 of the adaptive filter's time constants), delay tracking begins at 180, and the gain on the input to the digital up conversion process (82 in FIG. 2) is adjusted to maximize the dynamic range at 182.

FIGS. 8 and 9 are block diagrams illustrating, respectively, the coarse and fine processes of the invention implemented in the microprocessor of the baseband processing system 80 for coarse and fine delay and frequency estimation by the delay and frequency estimation unit 106.

FIG. 8 illustrates the process for coarse estimation of the relative delay and frequency offset between the two complex downconverted baseband uplink and downlink signals from DDC 72 (FIG. 2) input to the baseband processor 80. These inputs are denoted s1 and s2 in FIG. 8, and represent complex digitized baseband data streams corresponding to the uplink and the downlink signals. For the purposes of describing the operation, it will be assumed that s1 corresponds the uplink signal. (As used herein, the term "complex" refers to signals having both magnitude and phase values.)

The initial coarse processing determines an estimate of the relative delay and frequency offset between the uplink and downlink signals s1 and s2. In accordance with the invention, it does this by performing a series of complex cross correlations between the two signals s1 and s2. The correlations are performed over a wide range of assumed offsets in both frequency and delay. Each correlation assumes a fixed delay and frequency offset within the search range, which may be set based upon a priori knowledge of offsets and delays from past experience. The assumed delay and frequency offset are used to "adjust" one of the two inputs prior to performing the correlation. The correlation process is then performed, a different assumed offset is imposed, and the correlation process is repeated. The collection of results from many such correlation processes form a complex correlation "surface". Each element of this surface corresponds to the correlation for a unique delay/frequency offset pair. When the input signals are closely matched, i.e., highly correlated, with one another, the magnitude of the correlation surface will exhibit a strong localized peak. The peak (in magnitude) may be easily identified because it rises above the noise-like surface level that is characteristic of the other delay and frequency-offset pairs of the correlation surface. The location of the peak identifies the delay/frequency-offset pair which maximizes the cross correlation between the two signals, and hence provides an initial coarse estimate of these differences. The previously referenced Stein IEEE publication gives insights as to how one may configure initial search parameters, and indicates why such a process provides coarse estimates of delay and frequency.

The invention implements the coarse delay/frequency offset process in a highly advantageous manner so as to minimize the computational time and complexity otherwise required by exploiting certain properties of the Fourier transform to efficiently compute the requisite complex cross correlations. By implementing a correlation in the frequency domain, using the well-known product rule for transforms, correlations can in effect be performed in parallel for a range of delays corresponding to the extent of the input signal records used to compute the Fourier transforms. This is illustrated in FIG. 8.

As shown, the two complex input signals may each be snapshotted (acquired as blocks of samples) and Fourier transformed at 200 using an FFT process. A complex element-by-element product (202) of the two frequency domain sequences is then formed after first conjugating and shifting one of the two inputs at 203, and the result (204) is inverse Fourier transformed at 206 using an IFFT process. The resulting sequence at 208 represents the complex cross correlation of the two input signals.

The relative correlation delays of the FFT based cross correlation process span the range −N/2 to +N/2 where N is the duration of each input record or sample block. All are preferably computed in parallel by the FFT-based cross correlation. It is desirable to limit the search range to half of this range in order to minimize distortion in the output, which may result from the cyclic nature of a convolution when implemented with an FFT. This is a phenomena well-known to those skilled in the art and discussed in many texts on digital signal processing. The distortion is eliminated by constraining the data in one of the two input signals to a length of N/2, instead of N, and "zero padding" the rest of the input data values in the length N input vector.

Similarly, the invention exploits another property of Fourier transforms to efficiently generate the relative frequency offsets required. Relative frequency offsets between the two inputs can be implemented by pre-multiplying one of the two signals prior to the FFT process. However, this represents an added computational burden. Instead, the process employed by the invention implements an effective frequency shift of the data by shifting the position within the output array of the FFT. Computationally this is much more efficient than the equivalent pre-multiplication operation.

The product at 204 of the two transformed (FFT) sequences, one of which has been conjugated and shifted to implement the frequency offset, represents the frequency domain equivalent of a cross correlation between the original inputs. Inverse transforming this with an IFFT operation at 206 produces the desired cross correlation at 208.

The cross correlation outputs are prepared for further processing by performing an absolute value operation at 210. This is necessary because the magnitude of the correlation operation is required for subsequent processing. It is the magnitude, not the phase, which determines the degree to which the two signals are correlated.

Following the absolute value operation, the individual elements of the correlation (magnitude) are compared at 212, 214 with a threshold to identify candidate correlation peaks. The success of the technique is dependent upon a judicious choice of threshold. The invention employs a process wherein an estimate of the standard deviation for the noise like (correlation free) segment of the cross correlation output is computed. This is computed by forming the cross correlation using inputs with sufficient separation in delay and frequency offset to guarantee that they are uncorrelated. The threshold may then be set proportional to the standard deviation estimate. Using a threshold derived from the data itself provides much better sensitivity and increased reliability over a fixed absolute threshold. When the foregoing processing has identified a correlation peak, it becomes a candidate for confirmation as a real peak and for further processing (shown in FIG. 9) to confirm the peak and to refine the delay and frequency estimates.

FIG. 9 illustrates the processes of confirmation and fine mode estimate analysis in accordance with the invention. The basis for this processing, like that of the coarse mode of FIG. 8, is the computation of complex cross correlations between the two complex baseband input signals s1 and s2 representing the uplink and downlink signals, respectively. Unlike the coarse mode, however, the correlations are preferably computed discretely for individual delay and frequency offsets, rather than in parallel, for a few select points in the neighborhood of the candidate peak identified by the process of FIG. 8.

The complex cross correlation of the two input signals s1 an s2 is implemented by performing a complex conjugate multiplication at 220 of frequency offset (222) and delayed, i.e., time shifted, (224) versions of the two inputs, and accumulating, i.e., integrating, at 226 the result. The input signal s1 may be frequency offset by pre-multiplying it at 222 with a complex exponential function having the appropriate frequency. The input signal s2 is delayed at 224 by shifting it ±1 sample.

The path for confirmation of a candidate peak is somewhat similar to the path for coarse correlation peak detection in FIG. 8. The magnitude of the correlation function may be computed with an absolute value at 230, and compared at 232 with the same threshold that was previously used for the coarse mode threshold detection. In the confirmation process, however, the correlation magnitude values are preferably averaged over N successive values at 234, prior to the threshold comparison, to minimize the likelihood of falsely detected peaks from the initial coarse mode process. The process may be repeated for points within a small neighborhood about the initial peak.

Confirmation of a peak may then initiate a fine mode frequency analysis process. The one sample resolution in delay associated with the coarse and confirmation modes is sufficient for subsequent processing, and hence there is no need for further refinement of the delay estimate.

The basis for the fine mode frequency estimate is a set of N complex correlation values. This is the same set of N values whose averaged magnitudes confirmed the selected final peak, which were stored at 240. An N point FFT is performed at 242 on the N values. N has preferably been selected to be a power of 2 to facilitate performing an FFT at 242. The absolute value of the outputs from the FFT are computed at 224, and the peak value determined at 246. The location (index) of the peak value within the output FFT array may be scaled to provide a fine frequency estimate at 248.

While the foregoing has been with respect to preferred embodiments of the invention, it will be appreciate by those skilled in the art that changes may be made in these embodiments without departing from the principles and spirit of the invention, the scope of which is defined by the appended claims.

What is claimed is:

1. A method of canceling an interfering signal contained in a received signal which includes a signal of interest, the interfering signal being a relayed version of a transmitted signal from the location of the received signal, the method comprising
converting the received signal and a replica of the transmitted signal to digital signals;
tracking variations in predetermined signal parameters resulting from relaying the transmitted signal between the interfering signal and the replica of the transmitted signal to produce a compensation signal;
combining the compensation signal and the received signal to cancel first variations between the interfering signal and the sample of the transmitted signal to produce the signal of interest;
generating an error signal representing uncanceled second variations between the interfering signal in the signal of interest; and
controlling said tracking with the error signal to reduce differences between the compensation signal and the interfering signal to produce the signal of interest.

2. The method of claim 1, wherein said tracking comprises applying a plurality of delays and frequency offsets to the sample of the transmitted signal to produce a plurality of delayed offset signals; and
producing said compensation signal from one of said plurality of delayed offset signals that has a high correlation with the interfering signal.

3. The method of claim 2, wherein said producing said compensation signal comprises selecting said delayed offset signal using said error signal to produce said compensation signal to have a delay that minimizes power in the interfering signal.

4. The method of claim 3, wherein said tracking comprises tracking a frequency offset between the received signal and the replica of the transmitted signal, and applying frequency compensation to said replica.

5. The method of claim 4, wherein said tracking said frequency offset and applying said frequency compensation comprises tracking the frequency offset and applying said frequency compensation using a phase locked loop.

6. The method of claim 4, wherein said tracking further comprises adaptively filtering the replica of the received signal with a variable finite impulse response filter.

7. The method of claim 6, wherein said tracking comprises controlling filter coefficients of said filter with said error signal to minimize fine delay, amplitude and phase offsets between the received signal and the compensation signal.

8. The method of claim 7, wherein said controlling the filter comprises determining the power in the signal of interest, and controlling the filter to minimize the power in the interfering signal.

9. The method of claim 1, wherein said relayed version of the transmitted signal undergoes varying delays and frequency offsets, and said tracking comprises tracking said varying delays and frequency offsets to produce said compensation signal.

10. The method of claim 1, wherein said method of canceling is performed on said digital signals at baseband.

11. A method of operating at baseband on digital signals to cancel an interfering signal in a received signal that contains the interfering signal and a signal of interest, the interfering signal corresponding to a relayed version of a transmitted signal, the method comprising:
estimating first differences in predetermined signal parameters between the transmitted signal and the interfering signal, said signal parameter differences resulting from relaying said transmitted signal;
applying first compensations corresponding to the estimated first differences to produce a first compensated version of the transmitted signal;
tracking variations in second differences between the first compensated version and the interfering signal to produce a second compensated version of the transmitted signal;
combining the second compensated version and the received signal to cancel at least in part the interfering signal and produce the signal of interest;
generating an error signal from the signal of interest; and
controlling said tracking with said error signal to reduce said second differences between the second compensated version and the interfering signal.

12. The method of claim 11, wherein said estimating comprises cross correlating said replica of the transmitted signal with the received signal to produce a cross-correlation, and determining the first delay and frequency compensations from said cross-correlation.

13. The method of claim 12, wherein said cross correlating comprises performing cross correlations over a range of selected delay and frequency offsets, collecting the results from said cross-correlations, comparing said collected results to a predetermined threshold value to locate a peak, and determining first signal parameter compensations from delay and frequency offsets associated with said peak.

14. The method of claim 13 further comprising determining a fine frequency compensation for said replica of the transmitted signal by accumulating a plurality of cross-correlation results to produce an average result; comparing the average result to the predetermined threshold to locate said peak; Fourier transforming the accumulated results; producing magnitude values from said results; and identifying a fine frequency compensation from an offset associated with a maximum magnitude value.

15. The method of claim 11, wherein said tracking comprises applying to the sample of the transmitted signal varying delay and frequency compensations in response to the error signal to produce said first compensated version of the transmitted signal; adaptively filtering the first compensated version to track variations in delay, amplitude and phase; and applying compensations for said variations to the replica to produce the second compensated signal.

16. The method of claim 15, wherein said applying a compensation for varying delay comprises delaying the replica of the transmitted signal in response to the error signal, and wherein applying a compensation for varying frequency comprises tracking the frequency of the delayed replica with a phase lock loop controlled by the second compensated signal and the received signal.

17. The method of claim 16 further comprising measuring power in the signal of interest to produce the error signal, and controlling said adaptive filtering and said variable delay with said error signal to minimize the power in the interfering signal.

18. An interference canceller for canceling an interfering signal corresponding to a relayed version of a transmitted signal from a received signal containing the interfering signal and a signal of interest, comprising
- a first variable signal parameter compensator for applying a first signal parameter compensation to a replica of the transmitted signal;
- a second variable signal parameter compensator for applying a second signal parameter compensation to the of the transmitted signal;
- an adaptive filter for tracking variations in said first and second signal parameters in said following said first and second compensations and for producing a cancellation signal; and
- a combiner for combining the received signal and the cancellation signal to cancel the interfering signal and produce the signal of interest.

19. The canceller of claim 18, wherein the adaptive filter comprises a FIR filter having a plurality of fixed delay stages, each stage having a tapped output and a corresponding weight element, and a summer for providing a combined output of said tapped stages.

20. The canceller of claim 19 further comprising a minimum output power processor for determining the output power in the signal of interest and for generating an error signal for controlling said adaptive filter to minimize power in said interfering signal.

21. The canceller of claim 20 further comprising an analog to digital converter for converting said the received signal and the replica of the transmitted signal to digital signals, and a downconverter for downconverting the digital signals to corresponding digital baseband signals; said variable signal parameter compensators, said adaptive filter and said combiner operating on said digital baseband signals.

* * * * *

UNITED STATES PATENT AND TRADEMARK OFFICE
CERTIFICATE OF CORRECTION

PATENT NO. : 7,228,104 B2
APPLICATION NO. : 11/045782
DATED : June 5, 2007
INVENTOR(S) : Glenn D. Collins, Don L. Anair and Michael J. Ready It is certified that error appears in the above-identified patent and that said Letters Patent is hereby corrected as shown below:

Column 15: lines 18 and 28, each occurrence of "sample" should read --replica--; line 21, "between" should read --of--; line 47, "received" should read --transmitted--.

Column 16: line 25, "said replica" should read --a replica--; line 48, "the sample" should read --a replica--.

Column 17: line 10, "the of the transmitted" should read --the replica of the transmitted--; line 12, "in said following" should read --in said replica following--.

Signed and Sealed this

Twentieth Day of April, 2010

David J. Kappos
*Director of the United States Patent and Trademark Office*